United States Patent
Kunert et al.

(10) Patent No.: US 10,347,006 B2
(45) Date of Patent: Jul. 9, 2019

(54) VEHICLE WHEEL ALIGNMENT METHODS AND SYSTEMS

(71) Applicant: SNAP-ON INCORPORATED, Kenosha, WI (US)

(72) Inventors: Joel A. Kunert, Maumelle, AR (US); Darwin Y. Chen, Conway, AR (US); George M. Gill, Conway, AR (US); Brian K. Gray, Conway, AR (US); Steven W. Rogers, Conway, AR (US); Ronald D. Swayne, Sherwood, AR (US); David A. Jackson, Point Roberts, WA (US); Rodney Harrell, Greenbrier, AR (US); Robert J. D'Agostino, Conway, AR (US); Bryan C. Minor, Conway, AR (US); Eric R. Sellers, Conway, AR (US); Sean P. Lecrone, Little Rock, AR (US); Larry D. Klotz, Sherwood, AR (US); Jonathan A. Sperry, Conway, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 0 days.

(21) Appl. No.: 15/678,825

(22) Filed: Aug. 16, 2017

(65) Prior Publication Data

US 2018/0053320 A1    Feb. 22, 2018

Related U.S. Application Data

(60) Provisional application No. 62/375,716, filed on Aug. 16, 2016, provisional application No. 62/377,954, filed on Aug. 22, 2016.

(51) Int. Cl.
*H04N 5/247* (2006.01)
*G06T 7/73* (2017.01)
(Continued)

(52) U.S. Cl.
CPC ............ *G06T 7/74* (2017.01); *G01B 11/2755* (2013.01); *G06T 7/60* (2013.01); *H04N 5/247* (2013.01);
(Continued)

(58) Field of Classification Search
CPC .............................. G01B 5/2755; G01B 5/255
(Continued)

(56) References Cited

U.S. PATENT DOCUMENTS 7,164,472 B2    1/2007   Dorrance et al.
7,313,869 B1    1/2008   Rogers
(Continued)

FOREIGN PATENT DOCUMENTS

CN          1427945 A      7/2003
CN          1447903 A      10/2003
(Continued)

OTHER PUBLICATIONS

Official Letter with Search Report issued in Taiwanese Patent Application No. 106127697, dated May 7, 2018 (English translation).
(Continued)

*Primary Examiner* — Anand S Rao
(74) *Attorney, Agent, or Firm* — McDermott Will & Emery LLP

(57) ABSTRACT

A wheel alignment system includes a side-to-side reference including an active reference pod and a passive reference pod disposed on opposite sides of the vehicle. The active reference pod includes a reference image sensor fixedly attached to a reference target, for mounting on a first side of the vehicle such that the reference image sensor produces image data including a perspective representation of the passive reference pod disposed on a second/opposite side of the vehicle. In operation, alignment cameras on the opposite (Continued)

sides of the vehicle capture perspective representations of targets mounted to vehicle wheels and of targets of the active and passive reference pods. A computer processes the image data to compute an alignment measurement of the vehicle based on a spatial relationship between the active reference pod and the passive reference pod determined according to the image data produced by the reference image sensor.

16 Claims, 11 Drawing Sheets

(51) Int. Cl.
*G01B 11/275* (2006.01)
*G06T 7/60* (2017.01)

(52) U.S. Cl.
CPC .... *G01B 2210/12* (2013.01); *G01B 2210/143* (2013.01); *G01B 2210/26* (2013.01); *G01B 2210/30* (2013.01); *G06T 2207/30252* (2013.01)

(58) Field of Classification Search
USPC .......................................................... 348/148
See application file for complete search history.

(56) References Cited

U.S. PATENT DOCUMENTS

| | | |
|---|---|---|
| 2002/0027651 A1 | 3/2002 | Jackson et al. |
| 2002/0080343 A1 | 6/2002 | Bux et al. |
| 2009/0031782 A1* | 2/2009 | Jackson ............. G01B 11/2755 73/1.75 |
| 2014/0219509 A1 | 8/2014 | Buzzi et al. |

FOREIGN PATENT DOCUMENTS

| | | |
|---|---|---|
| CN | 1464970 A | 12/2003 |
| CN | 1826508 A | 8/2006 |
| CN | 1908612 A | 2/2007 |

OTHER PUBLICATIONS

International Search Report and Written Opinion issued in International Application No. PCT/US2017/046753 dated Oct. 24, 2017.
Notification Concerning Transmittal of International Preliminary Report on Patentability, dated Feb. 28, 2019, issued in corresponding International Application No. PCT/US2017/046753 (7 pages).

* cited by examiner

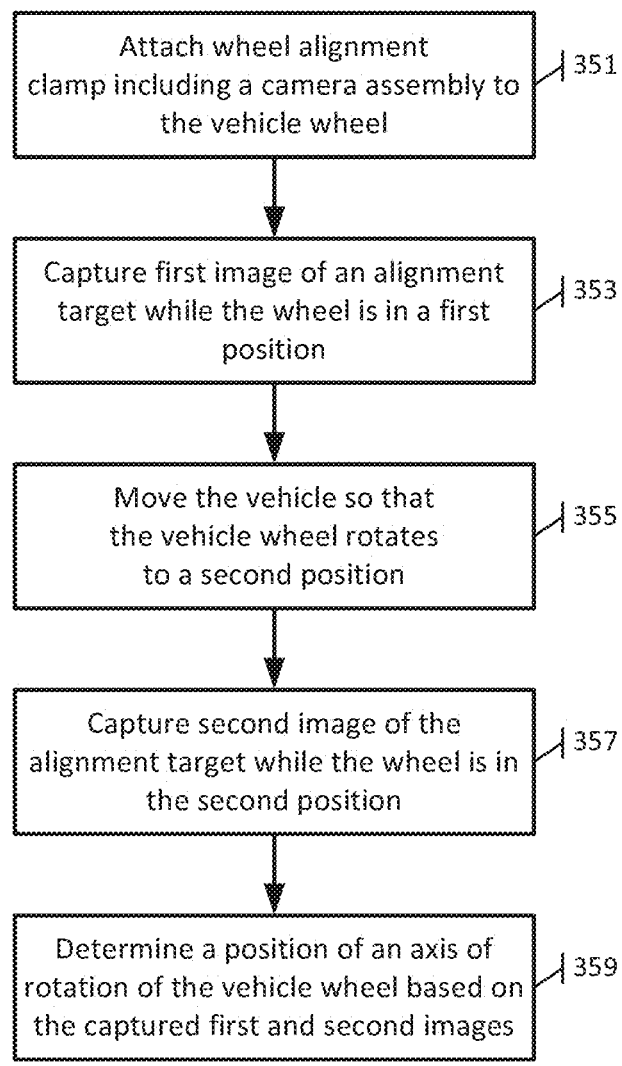

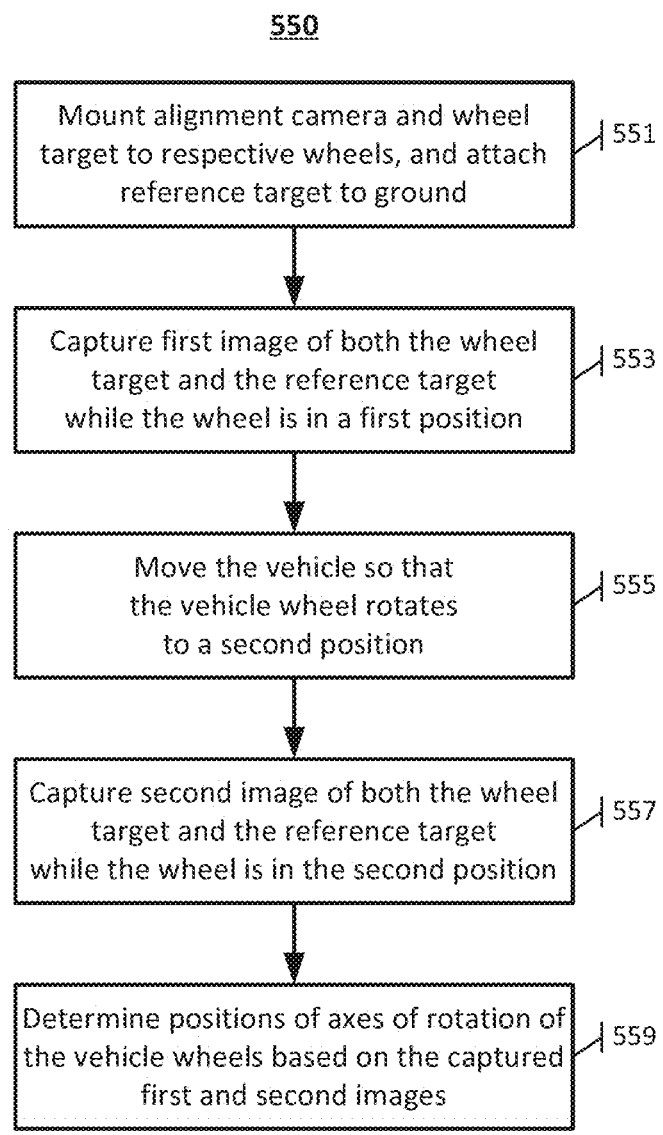

VEHICLE WHEEL ALIGNMENT METHODS AND SYSTEMS

CROSS-REFERENCE TO RELATED APPLICATIONS

This application claims the benefit of U.S. Provisional Patent Applications No. 62/375,716, filed Aug. 16, 2016, and No. 62/377,954, filed Aug. 22, 2016, the disclosures of which are hereby incorporated by reference in their entireties.

TECHNICAL FIELD

The present subject matter relates to equipment and techniques for measuring alignment of wheels of a vehicle.

BACKGROUND

Wheel alignment equipment is used to measure the alignment of the wheels of a vehicle. Based on the measurements, adjustments to be made to the vehicle and wheels are determined in order to bring the wheels into alignment. As part of the alignment measurement process, the alignment equipment commonly measures the relative alignment of wheels disposed on each side of the vehicle separately (e.g., on a left side and a right side). In order to relate measurements taken on one side of the vehicle with measurements taken on the other/opposite side of the vehicle, the alignment equipment generally needs to have a precise reference for relating the measurements taken on the one side to the measurements taken on the other/opposite side.

Alignment systems include conventional aligners, visual alignments, and self-calibrating aligners. In conventional aligners, a toe gauge is provided in one wheel alignment head attached to a vehicle wheel on one side of the vehicle. The toe gauge can measure an angle to another toe gauge provided in another wheel alignment head that is attached to a wheel on the other side of the vehicle. The aligner can then relate alignment measurements taken on the one side of the vehicle with alignment measurements taken on the other side of the vehicle based on the toe gauge measurement.

However, the toe gauges used in conventional aligners are attached to the alignment heads, and generally require use of a boom extending from the alignment head to look around the wheel that it is attached to. The presence of such booms results in large, heavy, and expensive alignment heads, and the toe gauges can be obstructed easily by the vehicle body since they are in a fixed position on the alignment head (e.g., any rotation of the alignment head, for example resulting from the rolling forward or backward of the vehicle, may result in the toe gauge being obstructed).

In visual aligners (e.g., camera-based aligners), a solid beam mounted to a fixed structure (e.g., a shop wall) holds two alignment cameras each looking down a respective side of the vehicle. The relative position of the two alignment cameras is maintained fixedly by the solid beam and, once the relative position is measured and stored in memory, the relative position of the alignment cameras can be used to relate alignment measurements taken on the one side of the vehicle (by one alignment camera) with alignment measurements taken on the other side of the vehicle (by the other alignment camera).

However, the cameras of the visual aligners are fixedly attached to a large beam. The large beam can get in the way of shop operations, and the presence of the large beam results in a system that is large, heavy, and expensive. Additionally, the large beam has minimum configurations options, and any deformation of the beam results in alignment measurement inaccuracies.

In the case of self-calibrating aligners, a calibration camera is provided in addition to two alignment cameras each looking down a respective side of the vehicle. The calibration camera has a fixed and known relative position to one of the two alignment cameras, and the calibration camera is oriented so as to point across a width of the vehicle towards the other of the two alignment cameras. Specifically, the calibration camera is oriented so as to point towards a calibration target that is attached to the other alignment camera, where the calibration target itself has a fixed and known relative position to the other alignment camera. In this set-up, the calibration can, as often as is required, obtain an image of the calibration target. In turn, based on the known relative positions between the calibration camera and the one alignment camera and between the calibration target and the other alignment camera, the alignment system can precisely determine the relative positions of the two alignment cameras. The determined relative position information is used to relate measurements taken by the alignment cameras on both sides of the vehicle.

However, while the self-calibrating aligners address some of the drawbacks of the conventional and visual aligners noted above, the self-calibrating aligners rely on a calibration camera or a calibration target being attached to each alignment camera. As a result, the aligner generally needs to be set-up in such a manner that the calibration camera (attached to one alignment camera) can see the calibration target (attached to the other alignment camera) while the alignment cameras are each oriented to see vehicle wheel alignment targets on a respective side of the vehicle. This set-up complexity restricts the acceptable locations of the alignment cameras (each having one of the calibration camera and the calibration target attached thereto), and limits some of the acceptable locations where the system can be used.

In order to address the drawbacks detailed above, there exists a need for a side-to-side reference that can be used when measuring the alignment of a vehicle.

SUMMARY

The teachings herein alleviate one or more of the above noted problems with conventional alignment systems.

In accordance with one aspect of the disclosure, a wheel alignment system includes a pair of first and second passive heads, an active reference pod, a passive reference pod, a pair of first and second active heads, and a computer. The pair of first and second passive heads, each having a target, are for mounting in association with a first pair of wheels disposed on first and second sides, respectively, of a vehicle that is to be measured by operation of the wheel alignment system. The active reference pod includes a reference image sensor fixedly attached to a reference target, for mounting on the first side of the vehicle such that the reference image sensor produces image data including a perspective representation of a passive reference pod includes at least one target disposed on the second side of the vehicle. The pair of first and second active heads, each having an image sensor, are for mounting in association with the first and second sides of the vehicle, respectively. The image sensor of the first active head produces image data including a perspective representation of the targets of the first passive head and of the active reference pod, and the image sensor of the second active head produces image data including a perspective representation of the targets of the second passive head and of the passive reference pod. The computer processes image data from the image sensors relating to the observations of the targets to compute at least one alignment measurement of the vehicle based on a spatial relationship between the active reference pod and the passive reference pod determined according to the image data produced by the reference image sensor.

In some embodiments, the computer computes the spatial relationship between the active reference pod and the passive reference pod based on the image data produced by the reference image sensor and including the perspective representation of the passive reference pod, and based on a known spatial relationship between the reference image sensor and the reference target of the active reference pod.

In some embodiments, the passive reference pod includes first and second targets, the reference image sensor produces image data including a perspective representation of the first target of the passive reference pod, and the image sensor of the second active head produces image data including a perspective representation of the second target of the passive reference pod. The first and second targets of the passive reference pod can have a known spatial relationship to each other, and the computer can compute the spatial relationship between the active reference pod and the passive reference pod according to the image data produced by the image sensors and the known spatial relationship between the first and second targets of the passive reference pod.

The active and passive reference pods may be for mounting to a stationary reference. The first and second active heads may be for mounting to a stationary reference. The first and second active heads may be for mounting to the vehicle that is to be measured by operation of the wheel alignment system. The first and second active heads may be for mounting in association with a second pair of wheels disposed on the first and second sides of the vehicle.

In accordance with a further aspect of the disclosure, a method for measuring an alignment of a vehicle includes attaching a pair of first and second passive heads, each including a target, in association with a first pair of wheels disposed on first and second sides, respectively, of the vehicle that is to be measured. An active reference pod, including a reference image sensor fixedly attached to a reference target, is provided on the first side of the vehicle. Image data including a perspective representation of a passive reference pod including at least one target disposed on the second side of the vehicle is captured using the reference image sensor of the active reference pod provided on the first side of the vehicle. Image data including a perspective representation of the targets of the first passive head and of the active reference pod is captured using an image sensor of a first active head mounted in association with the first side of the vehicle. Image data including a perspective representation of the targets of the second passive head and of the passive reference pod is captured using an image sensor of a second active head mounted in association with the second side of the vehicle. The image data from the image sensors relating to the observations of the targets is processed to compute at least one alignment measurement of the vehicle based on a spatial relationship between the active reference pod and the passive reference pod determined according to the image data produced by the reference image sensor.

In some embodiments, the processing includes computing the spatial relationship between the active reference pod and the passive reference pod based on the image data produced by the reference image sensor and including the perspective representation of the passive reference pod, and based on a known spatial relationship between the reference image sensor and the reference target of the active reference pod.

In some embodiments, the passive reference pod includes first and second targets, the capturing, using the reference image sensor, image data includes capturing image data including a perspective representation of the first target of the passive reference pod, and the capturing, using the image sensor of the second active head, image data includes capturing image data including a perspective representation of the second target of the passive reference pod. The first and second targets of the passive reference pod may have a known spatial relationship to each other, and the processing the image data may include computing the spatial relationship between the active reference pod and the passive reference pod according to the image data produced by the image sensors and the known spatial relationship between the first and second targets of the passive reference pod.

The method can further include mounting the active and passive reference pods to a stationary reference prior to capturing image data using the reference image sensor and the image sensors of the first and second active heads. The method can further include mounting the first and second active heads to a stationary reference prior to capturing image data using the image sensors of the first and second active heads. The method can further include mounting the first and second active heads in association with the vehicle that is to be measured by operation of the wheel alignment system prior to capturing image data using the images sensors of the first and second active heads. The mounting can optionally include mounting the first and second active heads in association with a second pair of wheels disposed on the first and second sides of the vehicle.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3B and 4B are high-level flow diagrams showing steps involved in use of fixed active-head wheel alignment systems such as those shown in FIGS. 3A and 4A in wheel measurement procedures in accordance with the principles of the disclosure.

FIG. 5B is a high-level flow diagrams showing steps involved in use of a fixed active-head wheel alignment system such as that of FIG. 5A in a wheel alignment procedure in accordance with the principles of the disclosure.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to improved equipment and approaches to performing vehicle wheel alignment, including improved equipment and approaches for performing alignment measurements of wheels disposed on opposite sides of a vehicle.

In order to address the drawbacks detailed above, a side-to-side reference is provided that can be used when measuring the alignment of a vehicle, and that is not necessarily attached to the wheel alignment heads or to the alignment cameras. The side-to-side reference can therefore be disposed or installed in many different locations, so as to be seen or referred to easily by the vehicle wheel alignment measuring system. Such a side-to-side reference may enable use of alignment heads with simplified streamlined designs (e.g., with lower complexity).

Figure 1A:
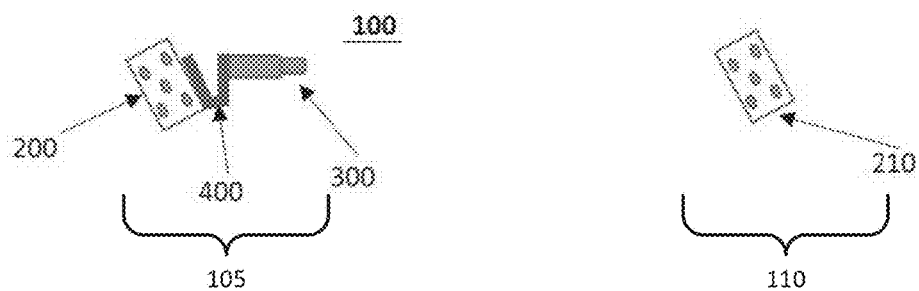
FIGS. 1A and 2A show illustrative side-to-side reference systems that may be used in wheel alignment and other systems and procedures in accordance with the principles of the disclosure.

FIG. 1A shows an illustrative side-to-side reference system 100 that may be used in accordance with the principles of the disclosure. As shown in FIG. 1A, the side-to-side reference system 100 includes an active reference pod 105 and a passive reference pod 110 that respectively include first and second reference targets 200, 210. The active reference pod 105 having the first reference target 200 has a reference image sensor such as a calibration camera 300 (or other type of image sensor) attached thereto. The calibration camera 300 has a fixed and known relative position and orientation to the first reference target 200. Furthermore, the calibration camera 300 is disposed so as to be oriented towards (and to look across to) the passive reference pod 110 including the second reference target 210 when the first and second reference targets 200 and 210 are used with a wheel alignment system. In use in a wheel alignment system, the active and passive reference pods 105 and 100 can be positioned anywhere as long as the calibration camera 300 of the active reference pod 105 can see the second reference target 210 of the passive reference pod 110, as shown in FIG. 1A, and as long as the first and second reference targets 200 and 210 can be seen by respective alignment cameras of the wheel alignment system.

As shown, each target 200, 210 has a characteristic pattern thereon (e.g., on a surface thereof), such as a characteristic pattern forms by dots, circles, or other geometric shapes. The geometric shapes may be of the same or different colors or sizes. The pattern formed by the geometric shapes is generally rotationally asymmetric such that the rotational orientation of the target can be determined based on the observed pattern. More generally, while targets having patterns thereon are shown in FIG. 1A, other types of targets can be used including targets including light emitting diodes (LEDs), targets having highly reflective surfaces, three dimensional targets in which patterns (or LEDs) are disposed on multiple different planes or surfaces, or the like.

Figure 1B:
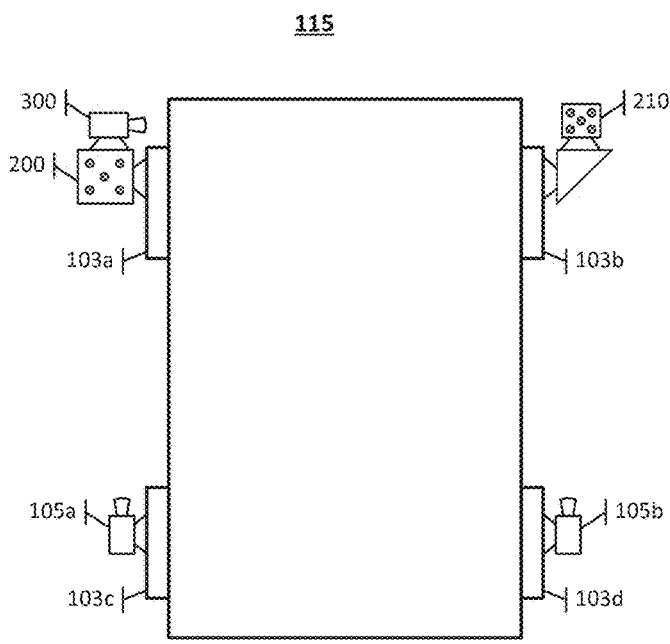
FIGS. 1B and 2B are block diagrams showing side-to-side reference systems such as those shown in FIGS. 1A and 2A in use in wheel alignment procedures in accordance with the principles of the disclosure.

The side-to-side reference system 100 is shown as it may be used in a wheel alignment system 115 in the illustrative example of FIG. 1B. In the example, a vehicle has four wheels 103a-103d that are undergoing a wheel alignment procedure and that each have a respective alignment head mounted thereto. The side-to-side reference system 100 is mounted as part of passive alignment heads to a set of wheels 103a, 103b disposed on opposite sides of the vehicle, although in other examples the side-to-side reference system 100 can be mounted to a fixed or stationary surface (see, e.g., FIGS. 6A and 6C, described below). For example, the active reference pod 105 and first reference target 200 may be mounted as a first passive alignment head to a first wheel 103a of the vehicle on a first side of the vehicle using a wheel mounting clamp or other appropriate mounting mechanism. The calibration camera 300, which forms part of the active reference pod 105 and is fixedly attached to the first reference target 200, is also mounted to the first wheel 103a via the fixed attachment bracket of the active reference pod 105. The passive reference pod 110 and second reference target 210 are mounted as a passive alignment head to a second wheel 103b of the vehicle on a second side of the vehicle (e.g., opposite to the first side) using a wheel mounting clamp or other appropriate mounting mechanism. The calibration camera 300 (of the active reference pod 105) and second reference target 210 (of the passive reference pod 110) are disposed such that the calibration camera 300 can see the second reference target 210 across the vehicle.

In addition, in the illustrative example of FIG. 1B, other components of a visual aligner are shown. First and second active alignment heads, respectively including first and second image sensors (e.g., alignment cameras 105a and 105b, or other image sensors), are mounted to third and fourth wheels 103c and 103d disposed on opposite sides of the vehicle, although in other embodiments the first and second alignment cameras 105a and 105b may be mounted to fixed references (e.g., mounted to ground, a wall, a floor, a tripod, a rack, a lift, or the like) with passive alignment heads mounted to the third and fourth wheels. The first alignment camera 105a is disposed such that it can see the active reference pod 105 including the first reference target 200 mounted to the first wheel 103a on the same side of the vehicle as the first alignment camera 105a, and the second alignment camera 105b is disposed such that it can see the passive reference pod 110 including the second reference target 210 mounted to the second wheel 103b on the same side of the vehicle as the second alignment camera 105b. As noted above, the first reference target 200 is fixedly attached to the calibration camera 300 and mounted to the first wheel 103a by use of a wheel clamp, for example, while the second reference target 210 is mounted to the second wheel 103b by use of a wheel clamp.

As noted above, the calibration camera 300 has a known relative position to the first reference target 200 in the active reference pod 105. The relative positional relationship can either be fixed at the time of manufacture and determined at that time, or fixed at a later time and measured through a calibration process. In some examples, the relative positional relationship can be adjustable, and can be measured through the calibration process following any adjustment in the positional relationship. In use, the relative positions of the first and second reference targets 200 and 210 can thus be determined based at least in part on the known (e.g., measured) relative position of the calibration camera 300 to the first reference target 200, and on the relative position of the calibration camera 300 to the second reference target 210 as determined based on one or more perspective images (and associated image data) of the second reference target 210 obtained using the calibration camera 300. In turn, wheel alignments can be determined based on the determined relative positions of the first and second reference targets 200 and 210 in combination with other alignment measurements. Specifically, when performing a wheel alignment measurement, the first and second reference targets 200 and 210 are positioned such that: (i) the calibration camera 300 can see the second reference target 210; and (ii) alignment cameras of the wheel alignment system can see the first and second reference targets 200 and 210. The relative positions of the first and second reference targets 200 and 210 can then be measured, e.g. based on one or more perspective images (and associated image data) of the second reference target 210 captured by the calibration camera 300.

Further, each alignment camera (e.g., 105a and 105b) of the wheel alignment system (e.g., 115) can see at least a respective one of the first and second reference targets 200 and 210, and the relative positions of the alignment cameras 105a and 105b can thus be determined based on the relative positions of the first and second reference targets 200 and 210 determined based on the images captured by the calibration camera 300. In this manner, measurements obtained by the alignment cameras 105a, 105b of the wheel alignment system 115 on opposite sides of the vehicle can be correlated to each other to determine the vehicle's overall wheel alignment measurements.

In one example, a wheel alignment system determines wheel alignments based on the determined relative positions of the first and second reference targets 200 and 210 in combination with other alignment measurements as detailed in the following paragraphs. In particular, a spatial relationship between the active reference pod 105 and the passive reference pod 110 is determined according to the image data produced by the reference image sensor 300 and including a perspective representation of at least one target of the passive reference pod 110. The determined spatial relationship is then used to establish the positional relationship between measurements performed by the alignment cameras 105a and 105b.

The wheel alignments are determined by transforming coordinates measured relative to one target (e.g., 200) into coordinates measured relative to the other target (e.g., 210).

The transformation is performed using a chain of coordinate transformations from the first to the second reference target as depicted in the following Equation 1:

$$T_{rt} = T_1(T_0)$$

Equation 1: Transformation from First Reference Target 200 to Second Reference Target 210

Where:

$T_0$ is the 3D rigid body transformation from the first reference target coordinate system 200 to the calibration camera coordinate system 300, $T_1$ is the 3D rigid body transformation from the calibration camera coordinate system 300 to the second reference target coordinate system 210, and $T_{rt}$ is the composite 3D rigid body transformation from the first reference target coordinate system 200 to the second reference target coordinate system 210.

In Equation 1 and in all subsequent equations, each transformation $T_i()$ denotes a three dimensional rigid body transformation (rotation and/or translation) from one coordinate system to another. A number of different coordinate transformation formalisms can be used to implement the transformations defined herein, including but not limited to: homogeneous transformation matrices, separate rotation matrices and translation vectors in Euclidean coordinates, rotations expressed as quaternions, etc. The disclosure is not limited to any specific coordinate transformation used or described, but can generally be used with any appropriate coordinate transformation.

Figure 2A:
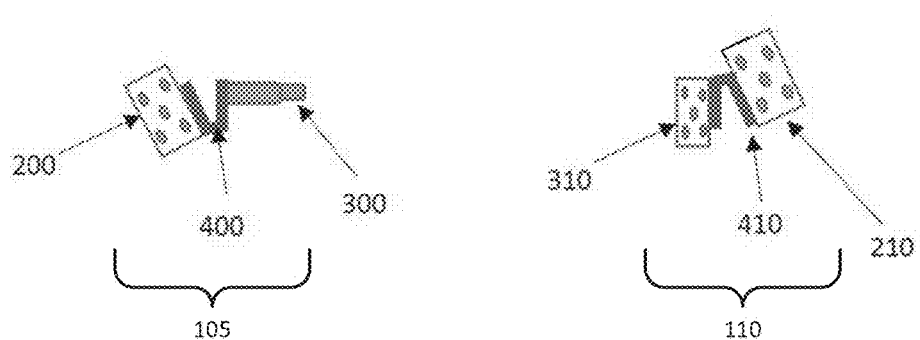
Figure 2B:
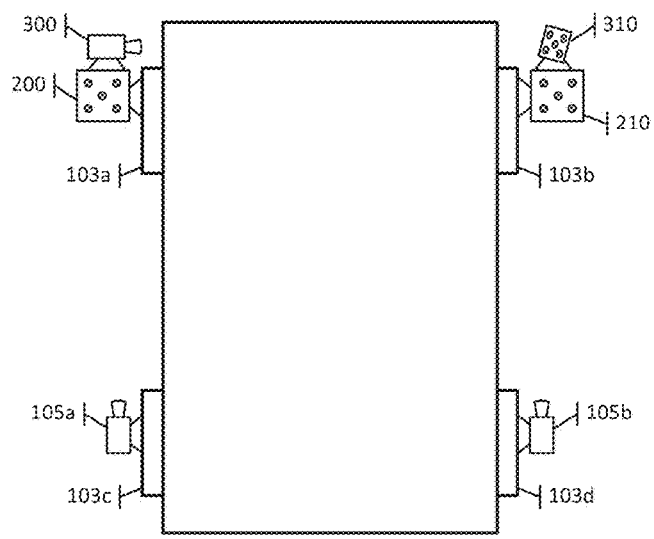

FIG. 2A shows an alternative form of a side-to-side reference system 201. Instead of the passive reference pod 110 including only a single second reference target 210 as shown in FIG. 1A, the passive reference pod 110 of FIG. 2A includes a calibration target 310 rigidly attached to the second reference target 210 by a target mount 410. In this way, the second reference target 210 and its associated calibration target 310 in the passive reference pod 110 can be targets that are not co-planar, for example, in order to provide for a wider range of positioning of the passive reference pod 110 and the second reference target 210 during alignment processes. For instance, FIG. 2B shows an illustrative visual alignment system that makes use of the side-to-side reference 201. As shown in FIG. 2B, the calibration target 310 may substantially face the calibration camera 300 (e.g., a direction across the vehicle) while the second reference target 210 faces the second alignment camera 105b (e.g., a direction towards a front or rear of the vehicle, along a same side of the vehicle).

With the known fixed relationship of the calibration camera 300 to the first reference target 200 in the active reference pod 105 and the known fixed relationship of the calibration target 310 to the second reference target 210 in the passive reference pod 110, the relative position of the first and second reference targets 200 and 210 can be determined based on a measurement of the position of the calibration target 310 with respect to the calibration camera 300 based on one or more perspective images (and associated image data) of the calibration target 310 captured by the calibration camera 300.

The chain of coordinate transformations used to transform coordinates expressed relative to the first reference target 200 to coordinates expressed relative to the second reference target 210 by way of an intermediate coordinate transformation is depicted in the following Equation 2:

$$T_{rt} = T_2(T_1(T_0))$$

Equation 2: Transformation from First to Second Reference Target Using an Intermediate Coordinate Transformation Where:

$T_0$ is the 3D rigid body transformation from the first reference target coordinate system 200 to the calibration camera coordinate system 300, $T_1$ is the 3D rigid body transformation from the calibration camera coordinate system 300 to the calibration target coordinate system 310, $T_2$ is the 3D rigid body transformation from calibration target coordinate system 310 to the second reference target coordinate system 210, and $T_{rl}$ is the composite 3D rigid body transformation from the first reference target coordinate system 200 to the second reference target coordinate system 210.

Each transformation $T_i$ in Equation 1 denotes a three dimensional rigid body transformation (rotation and/or translation) from one coordinate system to another.

In this example, the active and passive reference pods 105 and 110 and their first and second reference targets 200 and 210 are positioned such that the calibration camera 300 of the active reference pod 105 can see the calibration target 310 of the passive reference pod 110 and such that the alignment cameras (e.g., 105a and 105b in FIG. 2B) of the wheel alignment system 215 can respectively see the active and passive reference pods 105 and 110 and their first and second reference targets 200 and 210. Note that in each of these examples, any time the active and/or passive reference pod 105 and/or 110 or the reference target 200 and/or 210 is moved, new measurement of the relative position of the active reference pod 105 to the passive reference pod 110 (measured as a relative position of the calibration target 310 and the calibration camera 300) should be obtained.

During a wheel alignment procedure, the vehicle having its wheel alignment measured is commonly rolled forward and/or backward to cause the wheels to rotate, for example to measure run-out or compensation of the wheels. Specifically, measurements of wheel alignment targets of alignment heads mounted to the wheels are taken with the vehicle in a first position, the vehicle is then moved to a second position such that its wheels rotate forward or backward (e.g., by approximately 20° or more), and measurements of the wheel alignment targets mounted to the wheels are taken with the vehicle in the second position.

In general, in conventional and certain other types of aligners, in order for wheel alignment targets forming part of passive alignment heads mounted or attached to wheels of the vehicle (and/or for wheel alignment cameras or other wheel alignment sensors or measurement components forming part of active alignment heads mounted or attached to wheels of the vehicle) to maintain a proper orientation when the vehicle is in both the first and second positions, the wheel alignment targets (and/or wheel alignment cameras or other wheel alignment sensors) rotate around a shaft. Specifically, each target, camera, or sensor that is configured to be mounted or attached as part of an alignment head to a vehicle wheel is attached to a wheel clamp of the alignment head that can be securely clamped onto the wheel, and the target, camera, or sensor can rotate with respect to the wheel clamp around a rotation axis of the shaft. Thus, as the vehicle wheel rotates when the vehicle is moved forward or backward, the target, camera, or sensor rotates about the shaft to maintain a same orientation (e.g., a same orientation with respect to gravity or a vertical or horizontal reference). An angular measurement sensor attached to the shaft measures the angle of rotation of the wheel with respect to the target, camera, or sensor as the vehicle wheel is rotated when the vehicle moves from the first position to the second position. The presence of a rotation shaft, bearings, and other moving parts inside the wheel alignment heads increases cost and sensitivity to drops, and can add error into alignment measurements (e.g., as a result of stickiness in the bearings).

In visual aligners, alignment heads generally contain no moving parts or sensitive components. Instead, targets forming part of passive alignment heads are fixedly attached to the wheels of the vehicle, and positions of the targets are measured by alignment cameras located off the vehicle. Generally, the alignment cameras are installed at precisely calibrated positions on an external rig (e.g., including the aforementioned solid beam) that is attached to the floor, console, lift, or rack. This makes the existing vision based aligners more expensive, harder to move (e.g., between racks in a vehicle repair shop), and requires an unobstructed visual path between the cameras on the external rig and the targets mounted on the vehicle wheels.

To address the above-noted drawbacks in vehicle wheel alignment systems, a fixed active-head wheel alignment system includes a wheel alignment measuring head that can be fixedly attached to the vehicle wheels and that does not include a rotation shaft and bearings. In the fixed active-head wheel alignment system, the alignment measuring heads maintain fixed positions relative to their respective vehicle wheels and rotate when the vehicle wheels are rotated (e.g., when performing a compensation procedure). In the fixed active-head wheel alignment system, all parts of the wheel alignment measuring heads thus remain immobile with respect to the vehicle wheels when the vehicle wheels are rotated.

Figure 3A:
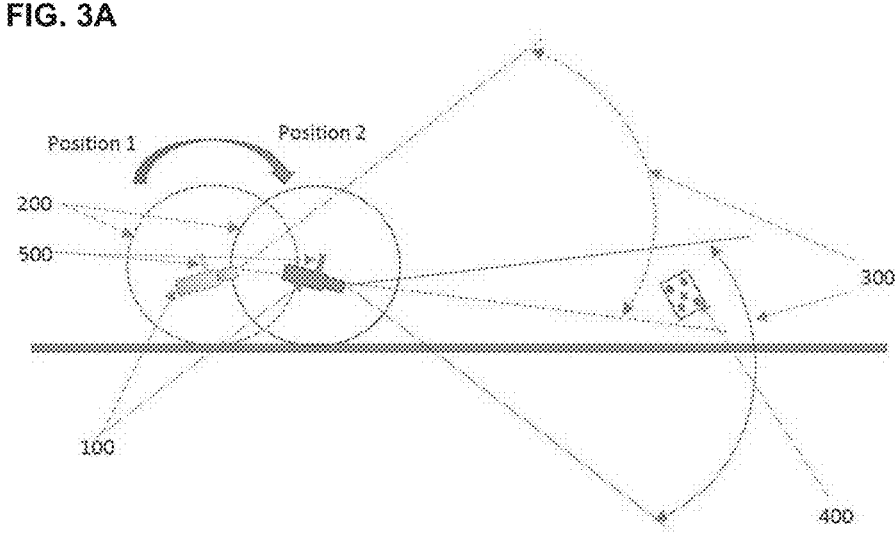
FIGS. 3A and 4A show illustrative fixed active-head wheel alignment systems that may be used in wheel measurement procedures in accordance with the principles of the disclosure.

In the fixed active-head wheel alignment system, as illustratively shown in FIG. 3A, an active alignment head including a camera assembly including an alignment camera 100 is rigidly mounted to a vehicle wheel 200 using a wheel clamp 500. The camera assembly including the alignment camera 100 is fixedly attached to the wheel clamp 500 and does not automatically rotate with respect to the wheel clamp 500 when the wheel 200 is rotated (e.g., the alignment camera 100 may instead automatically rotate with the wheel clamp 500 when the wheel 200 is rotated). As a result, when the wheel 200 is rotated from position 1 to position 2 (e.g., when the vehicle is moved between position 1 and position 2), the orientation of the camera assembly and the camera 100 changes as illustratively shown in FIG. 3A. The alignment camera 100 has a sufficiently large field of view (FOV) 300, for example about 30 degrees or more, in one direction such that a fixed reference target 400 (e.g., mounted to ground or other fixed reference surface) and/or a wheel-mounted target (e.g., mounted in a passive alignment head) remains within the FOV 300 as the wheel 200 is rotated from position 1 to position 2 during the compensation procedure, as shown in FIG. 3A. Note that the roll angle of the wheel 200 is typically around 20° (range: 15°-30°), and that the FOV 300 is sufficiently large to enable the alignment camera 100 to maintain the fixed reference target 400 and/or a wheel-mounted target within the FOV 300 as the wheel 200 is rotated approximately 20° (e.g., up to 30°).

In operation, the fixed active-head wheel alignment system can be used to perform an alignment procedure 350 such as that described in relation to FIG. 3B. The procedure or method 350 begins in step 351 with a wheel alignment clamp being attached to the wheel of the vehicle. The wheel alignment clamp can be a fixed active-head that includes a camera assembly attached to a clamp mechanism configured to fixedly attach the wheel alignment clamp to the wheel of the vehicle. The camera assembly includes alignment camera 100. In turn, the alignment camera 100 captures a first image including the fixed target 400 when the wheel 200 is in position 1, in step 353. Following the capturing of the first image, the vehicle is moved such that the vehicle wheel rotates to a second position different from the first position, in step 355. The alignment camera 100 then captures a second image including the target 400 when the wheel 200 is in position 2, in step 357. A processor connected to the alignment camera 100 then determines the position and orientation of the axis of rotation of the wheel 200 from the positions of the fixed target 400 in the first and second images (as the camera has rotated about the axis of rotation of the wheel 200 between the two images) in step 359. Specifically, the processor performs image processing of the first and second images to identify the location and position of the fixed target in the first and second images, and computes the position and orientation of the axis of rotation by determining the movement of the alignment camera 100 having given rise to the change in the position of the fixed target between the first and second images.

Note that in visual aligners, the axis of rotation of a wheel is determined by placing a target on the wheel and capturing images of the rotating target using a fixed camera. In contrast, in the present case, the axis of rotation of the wheel whose position and orientation are determined is the axis of rotation of the camera itself, which corresponds to the axis of rotation of the wheel 200 on which the camera 100 is fixedly mounted. The position and orientation of the axis of rotation is determined in a coordinate system of the fixed target 400 (e.g., a fixed coordinate system that does not move as the wheel 200 and vehicle are moved between positions 1 and 2).

The mathematical description of the axis of rotation calculation for a rotating camera is as follows. There are two different calculation scenarios: (1) the axis of rotation for a camera that is rigidly attached to a wheel while observing a stationary reference target, and (2) the axis of rotation for a target that is rigidly attached to a wheel while being observed by a camera that is also rotating.

For the first scenario, in which the camera rotates while observing a stationary reference target:

$$V_1 = V_{01} V_0$$

Equation 3: Rotation of Alignment Camera 100 with respect to a fixed reference target 400 from an initial to a second position Where:

$V_0$ is the 3D rotation from a Fixed Reference Target Coordinate System 400 to an Alignment Camera Coordinate System 100 at the initial position, $V_1$ is the 3D rotation from a Fixed Reference Target Coordinate System 400 to an Alignment Camera Coordinate System 100 at the second position, and $V_{01}$ is the 3D rotation of the Alignment Camera Coordinate System 100 from the initial to the second position The following calculation can be performed to compute $V_{01}$:

$$V_{01} = V_1 V_0^{-1}$$

Equation 4: Computation of Composite 3D Rotation between Initial and Second Orientations of the Alignment Camera Coordinate System 100

The axis of rotation $\hat{u}$ is the principal axis about which all rotation occurs. It can be computed as the principal eigenvector of the rotation matrix $V_{01}$ that rotates from an initial to a second orientation:

$$\hat{u} = eig(V_{01})$$

Equation 5: Computation of Axis of Rotation of an Alignment Camera Coordinate System Rotating Between Two Orientations Where:

$eig(V_{01})$ denotes the eigenvector/eigenvalue decomposition applied to the rotation matrix $V_{01}$.

This eigen-decomposition can be computed in variety of different standard methods, including but not limited to: characteristic polynomial root methods, QR decompositions, power iteration methods, and Rayleigh quotient iterations.

$\hat{u}$ is the eigenvector corresponding to the largest individual eigenvalue computed in the eigen-decomposition.

Figure 5A:
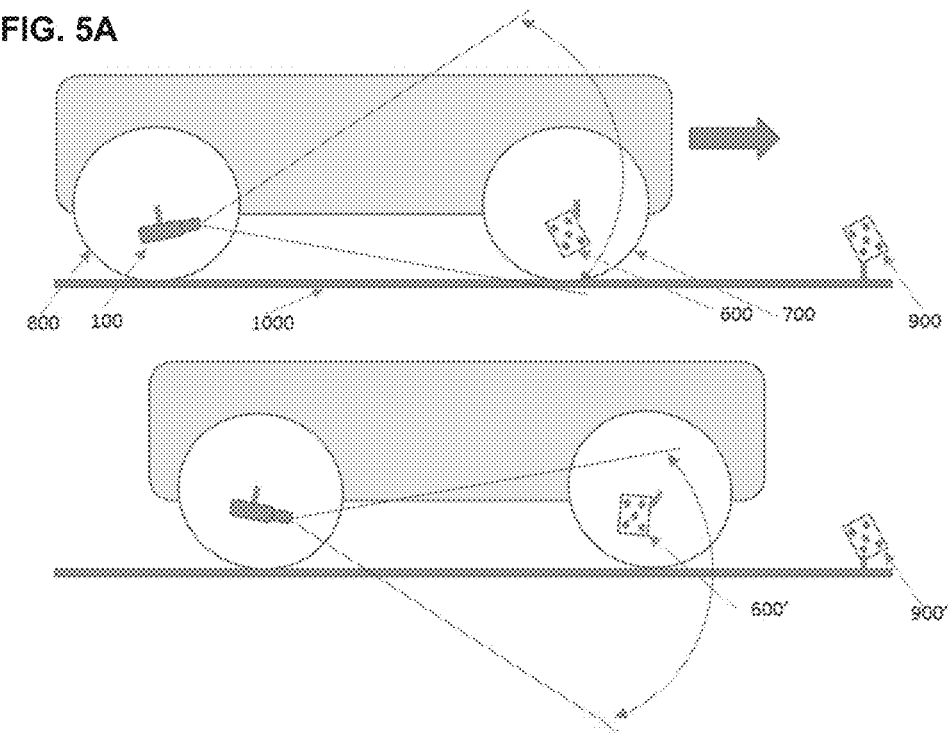
FIG. 5A shows an illustrative fixed active-head wheel alignment system used in wheel alignment procedures in accordance with the principles of the disclosure.

The processing chain is similar for the scenario of a target that is rigidly attached to a wheel that is observed by a camera that is also rotating (see, e.g., FIG. 5A). In this example, a camera 100 forming part of an active alignment head is mounted to a first wheel 800 that is subject to rotation, a wheel mounted target 600 forming part of a passive alignment head is mounted a second wheel 700 that is subject to rotation, and a reference target 900 has a fixed position (e.g., mounted to ground or other fixed reference frame), as shown in FIG. 5A. As in the previous axis of rotation scenario, let $U_0$ and $U_1$ be the three dimensional orientations of a fixed reference target coordinate system (e.g., coordinate system tied to the fixed reference target 900) as viewed from the rotating camera coordinate system in two different positions. Let $W_0$ and $W_1$ be the three dimensional orientations of a rotating and translating target coordinate system measured with respect to the same reference camera coordinate system that views the fixed reference targets. In this scenario, the camera coordinate system exhibits a rigid body transformation while the wheel mounted target coordinate system also exhibits a rigid body transformation (though not necessarily the same transformation). The reference target 900 does not experience a rigid body transformation. As the reference target maintains a fixed pose while the camera and wheel mounted targets are rotated and translated, it can serve as a reference coordinate system in which the axis of rotation can be computed for the rotating wheel mounted target. In such a scenario, the transformation from the camera coordinate system to the reference target coordinate system can be employed. The three dimensional orientations of the wheel mounted targets with respect to the fixed reference target at position 0 and position 1 can be computed as:

$$P_0 = W_0 U_0^{-1}$$

Equation 6: 3D Orientation of a Wheel Mounted Target Coordinate System with respect to a Fixed Reference Target Coordinate System at the initial position Where:

$U^{-1}_0$ is the inverse rotation from the Alignment Camera Coordinate System to the Fixed Reference Target Coordinate System at the initial position; that is, it is the rotation from the Fixed Reference Target Coordinate System to the Alignment Camera Coordinate System at the initial position, $W_0$ is the rotation from the Alignment Camera Coordinate System to the Wheel Mounted Target Coordinate System at the initial position, and $P_0$ is the rotation from the Fixed Reference Target Coordinate System to the Wheel Mounted Target Coordinate System at the initial position.

Likewise, a similar formula can be used to compute the orientation of the Wheel Mounted Target Coordinate system with respect to the Fixed Reference Coordinate System at the second position:

$$P_1 = W_1 U_1^{-1}$$

Equation 7: 3D Orientation of a Wheel Mounted Target Coordinate System with respect to a Fixed Reference Target Coordinate System at the second position Where:

$U^{-1}_1$ is the inverse rotation from the Alignment Camera Coordinate System to the Fixed Reference Target Coordinate System at the second position; that is, it is the rotation from the Fixed Reference Target Coordinate System to the Alignment Camera Coordinate System at the second position, $W_1$ is the rotation from the Alignment Camera Coordinate System to the Wheel Mounted Target Coordinate System at the second position, and $P_1$ is the rotation from the Fixed Reference Target Coordinate System to the Wheel Mounted Target Coordinate System at the second position.

The rotation matrix $P_{01}$ that rotates the Wheel Mounted target Coordinate System axes from $P_0$ to $P_1$ can be computed as:

$$P_{01} = P_1 P_0^{-1}$$

Equation 8: 3D Rotation of the Wheel Mounted Target Coordinate System from the initial to the second orientation The axis of rotation $\hat{w}$ defines the three dimensional vector about which all rotation is performed. As in the previous scenario, it can be computed as:

$$\hat{w} = eig(P_{01})$$

Equation 9: Computation of Axis of Rotation of a Wheel Mounted Target Coordinate System Rotating Between Two Orientations Where:

$eig(P_{01})$ denotes the eigenvector/eigenvalue decomposition applied to $P_{01}$. This eigen-decomposition can be computed in variety of different standard methods, including but not limited to: characteristic polynomial root methods, QR decompositions, power iteration methods, and Rayleigh quotient iterations, and $\hat{w}$ is defined to be the principal eigenvector corresponding to the largest individual eigenvalue.

Because the fixed target 400 takes up some of the FOV 300 of the camera 100 (see, e.g., FIG. 3A), and because the roll angle of the wheel 200 increases the FOV 300 needed to view the fixed target 400 at both positions 1 and 2, the camera 100 may need to have a very large FOV 300 in order to capture the appropriate images of the target 400 as detailed above. Typically, cameras are faced with a design trade-off between the FOV and the camera's imaging resolution: a larger FOV can be obtained at the cost of a lower resolution. Thus, in order to obtain a large FOV, a camera may have a lower resolution. In the present case, however, the alignment camera 100 must have a high resolution in order to be used for high precision wheel alignment procedures. Thus, merely increasing the camera's FOV at the expense of lowered resolution is typically not desirable. Instead, in order to provide a wide FOV 300 while maintaining a high resolution, an alternative solution is presented in FIG. 4A.

Figure 4A:
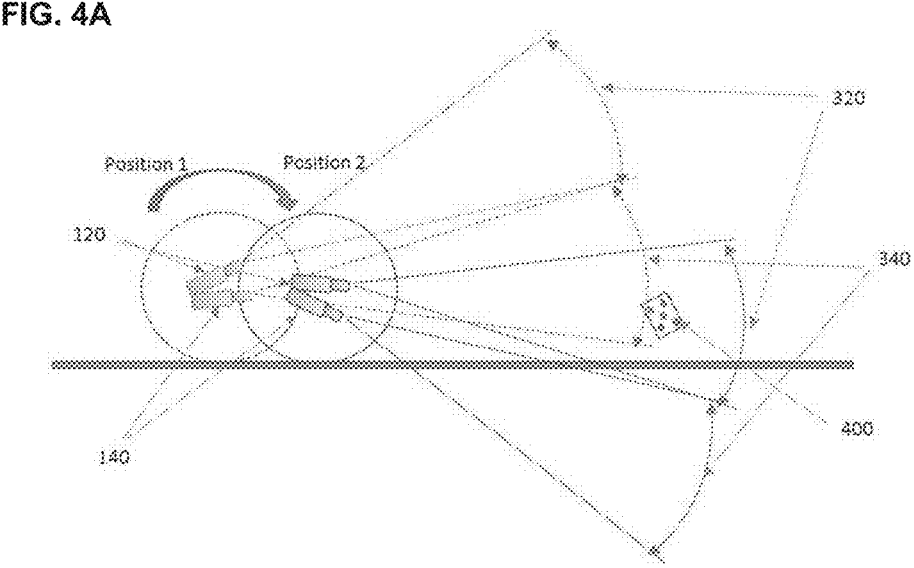

In FIG. 4A, a camera assembly including two (or more) alignment cameras 120 and 140 forming part of an active alignment head is rigidly mounted to a same wheel clamp. Specifically, the active alignment head includes a clamp mechanism configured to fixedly attach the alignment head to a vehicle wheel, and a camera assembly including two cameras is rigidly attached to the clamp mechanism. The two alignment cameras 120 and 140 in the camera assembly are mounted fixedly relative to each other so as to have an angular separation in the direction of the wheel roll. For example, the alignment cameras 120 and 140 may be mounted such that their central axes (extending in a center of each camera's FOV) form a non-zero angle. The camera assembly including cameras 120 and 140 is attached to the wheel to be measured using a wheel clamp (e.g., 500 of FIG. 3A). In the assembly, each camera 120 and 140 need not have a large FOV, but can instead have a smaller FOV 320 and 340 respectively. However, the camera assembly including the two (or more) cameras 120 and 140 has a large combined FOV formed by a combination of the smaller FOVs 320 and 340. During an alignment procedure, so long as at least one of the cameras 120 and 140 can image the target (e.g., fixed target 400) when the wheel is in position 1, and so long as the same one or another one of cameras 120 and 40 can image the target when the wheel is in position 2, a wheel alignment measurement can be determined.

For example, in the example of FIG. 4A, the fixed target 400 is only in the FOV 340 for the lower camera 140 when the wheel is in position 1, and the fixed target 400 is only in the FOV 320 of the upper camera 120 when the wheel is in position 2. Hence, even though the wheel is rolled through the same angle between positions 1 and 2 in each of FIGS. 3A and 4A, the cameras 120 and 140 (which have smaller FOVs 320 and 340 than the FOV 300 of camera 100) can be used since they are mounted as a pair.

Figure 4B:
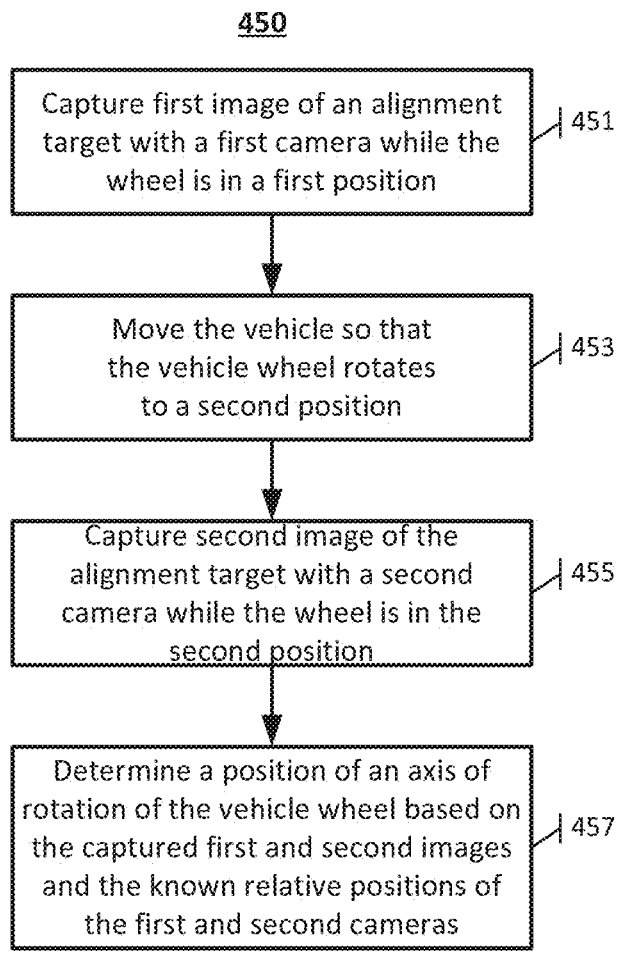

In operation, as shown in the procedure 450 shown in FIG. 4B, a first image of the alignment target 400 is captured using the first camera 140 while the vehicle and wheel of the vehicle are in position 1, in step 451. Following the capturing of the first image, the vehicle is moved such that the vehicle wheel rotates to a second position different from the first position, in step 453. A second image of the alignment target 400 is then captured using the second camera 120 while the vehicle and wheel of the vehicle are in position 2, in step 455. The position of the axis of rotation of the vehicle wheel having the camera assembly (including cameras 120 and 140) attached thereto is determined based on the captured first and second images of the alignment target 400 and a known position of the first camera relative to the second camera, in step 457.

Note that once the relative position of the cameras 120 and 140 is fixed, a calibration procedure is performed to precisely determine the relative positions of the cameras relative to each other. Knowledge of the relative positions of the cameras is then used to determine the relative positions of targets imaged by one camera in the other camera's coordinate system. In examples in which the FOVs 320 and 340 of the cameras 120 and 140 overlap, the calibration can be performed by capturing an image of a target positioned in the overlap region of the FOVs with each camera and, based on the captured image, determining the relative positions of the cameras.

A process for transforming one camera's coordinates into the other can involve the following equation:

$$T_u = T_{lu}(T_l)$$

Equation 10: Transformation of a Target Coordinate System 400 from the Lower Camera Coordinate System 140 to the Upper Camera Coordinate System 120

Where:

$T_l$ is the pose of a Target Coordinate System 400 in the Lower Camera Coordinate System 140, $T_u$ is the pose of a Target Coordinate System 400 in the Upper Camera Coordinate System 120, and $T_{lu}$ is the 3D rigid body transformation from the Lower Camera Coordinate System 140 to the Upper Camera Coordinate System 120.

In examples in which the FOVs 320 and 340 of the cameras 120 and 140 do not overlap (e.g., so as to obtain a wider total FOV), the relative positions of the cameras can be determined using, for example, the first and second targets 200 and 210 described above. In such examples, one target (e.g., 200) is imaged with one camera (e.g., 120) while the other target (e.g., 210) is imaged using the other camera (e.g., 140), and the relative positions of the cameras 120 and 140 is determined based on the captured images of the targets 200 and 210 and the known relative positions of the targets 200 and 210.

FIG. 5A shows an implementation example in which a wheel alignment is being performed on a vehicle using both the side-to-side reference system and the fixed active-head wheel alignment system.

As shown in FIG. 5A, a passive head including a wheel target 600 is rigidly mounted to the front wheel 700 of the vehicle using a wheel clamp (e.g., 500 of FIG. 3A). An active head including an alignment camera 100 is rigidly mounted to the rear wheel 800 of the vehicle using a wheel clamp (e.g., 500 of FIG. 3A). A reference target 900 is rigidly attached to the rolling surface 1000 that the vehicle is supported on with a reference support. The reference target 900 is positioned within the FOV of the alignment camera 100 such that it can be seen by the camera 100.

In operation, as shown in the procedure 550 of FIG. 5B, the alignment camera 100 and wheel target 600 are mounted to respective wheels of the vehicle, and the reference target 900 is attached to a stationary reference, in step 551. In step 553, the alignment camera 100 then captures a first image of both the wheel target 600 and the reference target 900, and the positions of the wheel target 600 and of the reference target 900 with respect to the camera 100 are calculated based on the captured first image. The vehicle is then moved (e.g., moved forward by approximately 8"), as shown in the lower half of FIG. 5A and in step 555. The alignment camera 100 then captures a second image of the wheel target 600 and reference target 900 in step 557, and the positions of the wheel target 600 and of the reference target 900 with respect to the camera 100 are calculated based on the captured second image. The position (and orientation) of the rear wheel's axis of rotation, corresponding to the wheel on which the active head having the alignment camera 100 is mounted, is calculated based on the change in position of the reference target 900 in the first and second images captured at the two camera positions, in step 559. Additionally, also in step 559, the position (and orientation) of the front wheel's axis of rotation, corresponding to the wheel on which the passive head having the alignment target 600 is mounted, is calculated by firstly transforming the front target's position into the reference target's coordinate system at each vehicle position, and secondly calculating the axis of rotation from the change of position of the front target 600 in the reference target coordinate system. Based on these computations, the two wheel axes' positions are determined on one side of the vehicle. A similar process can be performed on the other side of the vehicle to determine the two wheel axes' positions on the other side of the vehicle.

In the foregoing description, the camera 100 is described as being attached to a rear wheel and the target 600 is described as being attached to a front wheel of the vehicle. However, the target could be attached to the rear wheel and the camera to the front wheel. Alternatively, the reference target 600 could be attached to a rack, floor, tripod, or other type of attachment, for example in situations in which only one wheel's axis of rotation is to be determined (e.g., the axis of rotation of the wheel on which the alignment camera is mounted).

Figure 6A:
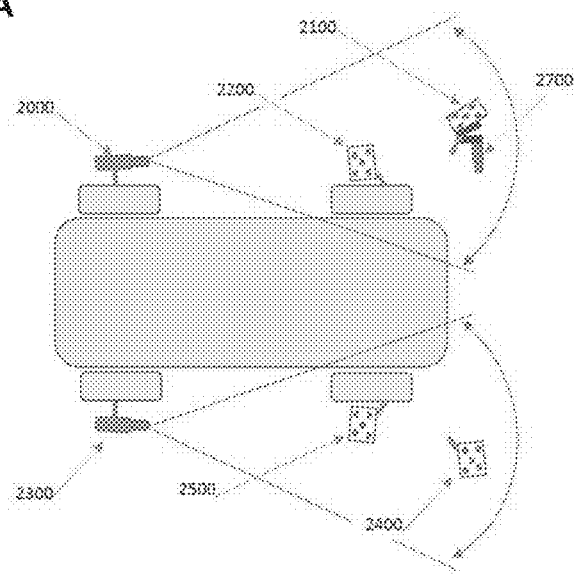
FIGS. 6A and 6C show illustrative side-to-side reference systems used in four-wheel alignment procedures in accordance with the principles of the disclosure.

The description of FIG. 5A is focused on measurements performed on one side of the vehicle. FIG. 6A provides additional detail on measurements performed on both sides of the vehicle.

For a four wheel alignment, a second set of an alignment camera and targets can be mounted on the other side of the vehicle, as shown in FIG. 6A. As the reference targets (e.g., 900), the side-to-side reference 100 described above in relation to FIGS. 1A and 2A can be used. As shown in FIG. 6A, the left wheel active head including the alignment camera 2000 captures an image of the left reference target 2100 of the active reference pod and the left wheel target 2200, the right wheel active head including the alignment camera 2300 captures an image of the right reference target 2400 of the passive reference pod and the right wheel target 2500. The calibration camera 2700 of the active reference pod captures an image of the right reference target 2400 of the passive reference pod across a width of the vehicle. Using the previously calibrated or known relative position of the calibration camera 2700 to the reference target 2100 of the active reference pod, the relative positions of the active and passive reference pods (and of the two reference targets 2100 and 2400 thereof) are determined. In turn, the coordinate reference frame of measurements established based on the images captured by the right camera 2300 can be transformed into the coordinate reference frame associated with the measurements established based on the images captured by the left camera 2000, based on the determined relative positions of the active and passive reference pods and reference targets 2100 and 2400.

Figure 6B:
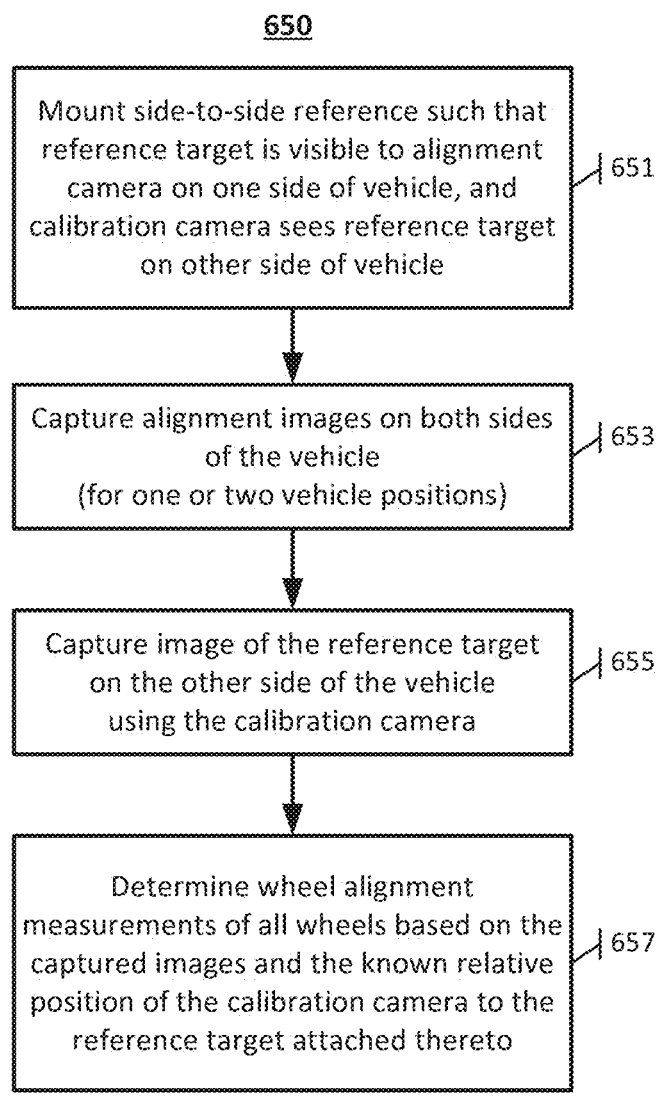
FIG. 6B is a high-level flow diagram showing steps involved in use of a side-to-side reference system such as that of FIG. 6A in a wheel alignment procedure in accordance with the principles of the disclosure.

In operation, as shown in the procedure 650 of FIG. 6B, the side-to-side reference is mounted such that reference target 2100 of the active reference pod is visible to the active alignment head (and alignment camera 2000) on one side of vehicle, and the calibration camera 2700 of the active reference pod sees the reference target 2400 of the passive reference pod on the other side of vehicle (step 651). In step 653, alignment images are captured using both of the alignment cameras 2000 and 2300 of the active alignment heads at one or both of the first and second positions of the vehicle. For example, the steps 551-557 of method 550 may be performed using the alignment cameras and targets mounted on each side of the vehicle to obtain first, second, third, and fourth images. Alternatively, just two images may be captured: image data including a perspective representation of the targets 2200 and 210 of the first passive head and of the active reference pod may be captured using an image sensor 2000 of a first active head mounted in association with the first side of the vehicle, while image data including a perspective representation of the targets 2500 and 2400 of the second passive head and of the passive reference pod may be captured using an image sensor 2300 of a second active head mounted in association with the second side of the vehicle. Additionally, a further image of the reference target 2400 of the passive reference pod on the other side of the vehicle is captured using the calibration camera 2700 of the active reference pod, in step 655. Finally, one or more wheel alignment measurements of the vehicle, including wheel alignment measurements of some or all wheels, are determined in step 657 based on the captured images and based on a spatial relationship between the active reference pod and the passive reference pod determined according to the image data produced by the reference image sensor. For example, the spatial relationship between the active reference pod and the passive reference pod can be determined based on the image data produced by the reference image sensor 2700 and including the perspective representation of the passive reference pod 2400, and based on a known spatial relationship between the reference image sensor or calibration camera 2700 and the reference target 2100 attached thereto in the active reference pod.

Specifically, the positions of the passive reference pod (including the right reference target 2400) and the right passive head (including wheel target 2500) are firstly determined from the image(s) captured by the right alignment camera 2300 in a coordinate system centered on the right alignment camera 2300; the determined positions are then transformed into coordinates centered on the passive reference pod and first reference target 2400; the transformed coordinates are then once again transformed into coordinates centered on the active reference pod and second reference target 2100 based on the determined relative positions of the active and passive reference pods and reference targets 2100 and 2400; and finally, the transformed coordinates are further transformed into coordinates centered on the left active head including alignment camera 2000.

A process for transforming coordinates from camera to target to target to camera can involve the following equation:

$$T_{lcam\_rref} = T_{calcam\_rref}(T_{lref\_calcam}(T_{lcam\_lref}))$$

Equation 11: Transformation from Left Camera Coordinate System 2000 to the Right Reference Target Coordinate System 2400

Where:

$T_{lcam\_lref}$ is the 3D rigid body transformation from the Left Camera Coordinate system 2000 to the Left Reference Target Coordinate System 2100, $T_{lref\_calcam}$ is the 3D rigid body transformation from the Left Reference Target Coordinate system 2700 to the Calibration Camera Coordinate System 2700, $T_{calcam\_rref}$ is the 3D rigid body transformation from the Calibration Camera Coordinate System 2700 to the Right Reference Target Coordinate System 2400, and $T_{lcam\_rref}$ is the 3D rigid body transformation from the Left Camera Coordinate system 2000 to the Right Reference Target Coordinate System 2400.

The transformation expressed in Equation 11 can be used to perform the coordinate transformation from the right wheel target 2500 to the left camera coordinate system 2000:

$$T_{lcam\_rw} = T_{rcam\_rw}(T_{rcam\_rref}^{-1}(T_{lcam\_rref}))$$

Equation 12: Transformation from Left Camera Coordinate System 2000 to Right Wheel Target Coordinate System 2500

Where:

$T_{lcam\_rref}$ is the 3D rigid body transformation from the Left Camera Coordinate System 2000 to the Right Reference Target Coordinate System 2400 (as computed in Equation 11 above), $T^{-1}_{rcam\_rref}$ is the inverse of the 3D rigid body transformation from the Right Camera Coordinate System 2300 to the Right Reference Target Coordinate System 2500. I.e. it is the 3D rigid body transformation from the Right Reference Target Coordinate System to the Right Camera Coordinate System, $T_{rcam\_rw}$ is the 3D rigid body transformation from the Right Camera Coordinate System 2300 to the Right Wheel Target Coordinate System 2500, and $T_{lcam\_rw}$ is the 3D rigid body transformation from the Left Camera Coordinate System 2000 to the Right Wheel Target Coordinate System 2500.

Based on the determined relative positions of the various alignment heads and reference pods (including the various cameras and targets), both active alignment heads (including cameras 2000 and 2300) are thus able to measure positions of targets and transform the measured positions into the same coordinate system. Thus, the full vehicle alignment can be measured, for example by projecting the wheels axis in the vehicle base plane. The positions of targets measured using the left camera can be transformed into a coordinate system centered on the right camera in a similar manner. Alternatively, positions (and coordinates) can be transformed into a reference frame centered on one of the reference targets (e.g., 2100). In any case, since a common coordinate system is used, the alignment of all wheels can be measured.

In the examples of FIGS. 5A and 6A, it is also possible to use active alignment heads and camera assemblies including two or more cameras—such as those described above in relation to FIG. 4A. Such camera assemblies can be used in situations in which a wider FOV is needed. Additionally, in the example of FIG. 6A, the passive reference pod including the right reference target 2400 could include dual targets such as the passive reference pod 110 discussed in relation to FIG. 2A above. Also, while the active reference pod including the calibration camera 2700 is described as being on the left side of the vehicle, the active reference pod and calibration camera 2700 can alternatively be on the right side of the vehicle (e.g., attached to the reference target 2400, and looking across to the passive reference pod including the left reference target 2100).

In the various examples presented above, the reference targets (e.g., 400, 900, 900', 2100, 2400) are positioned so as to be in the FOV of a corresponding alignment camera. In some examples, the alignment camera is positioned so as to also concurrently include an alignment target (e.g., 600, 600', 2200, 2500) in its FOV. In order to position the reference targets at positions that are both in the FOV of the alignment camera and not occluded by the alignment targets in the FOV, the reference targets may be attached to the surface 1000 on which the vehicle is sitting (e.g., attached to the rack or vehicle lift, attached to the ground, or the like). In particular, the reference targets may be positioned so as to be in a consistent relative position with the alignment targets mounted to the wheels, but also positioned such that the reference target move with the vehicle (e.g., should the vehicle be positioned on a rack or vehicle lift and the rack or vehicle lift is raised).

In the foregoing description and figures, the active and passive reference pods are described and shown as being optionally mounted with passive alignment heads to wheels of the vehicle being measured (see, e.g., FIGS. 1B and 2B) or to a fixed or stationary reference (e.g., ground, a rack or lift, or the like) (see, e.g., FIG. 6A). As described, the wheel alignment systems incorporating the active and passive reference pods are configured to measure alignment values of a vehicle in both mounting situations.

Figure 6C:
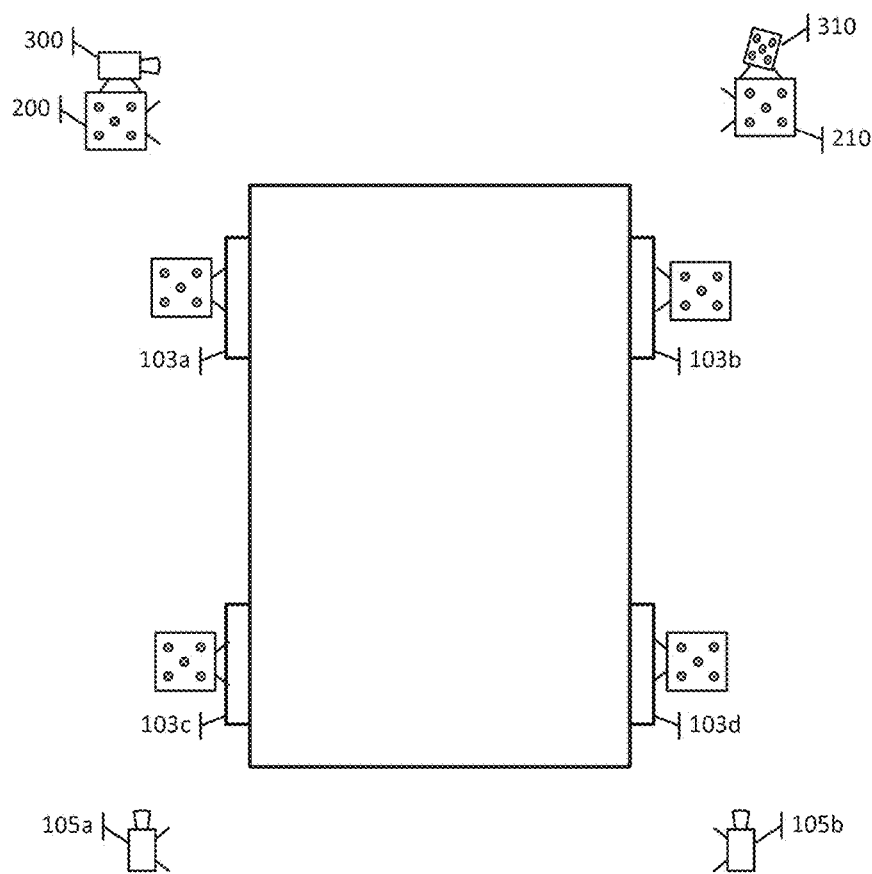

Additionally, while the foregoing description and figures have described and shown active alignment heads including the cameras (or image sensors) as being mounted to wheels of the vehicle, the active alignment heads can alternatively be mounted to a fixed or stationary reference (e.g., ground, a rack or lift, or the like). For example, FIG. 6C shows an alignment system 670 in which the active heads are mounted to a stationary reference such that that the image sensors (e.g., alignment cameras 105a and 105b) remain stationary throughout the alignment process even if the vehicle moves. The active heads included in the alignment cameras (105a and 105b) can be mounted to ground (e.g., using a tripod, a wall structure, or the like) such that they remain immobile even if the vehicle is lifted on a lift, or the active heads can be mounted to a vehicle lift or rack such that they are raised or lowered with the vehicle when the vehicle is lifted and lowered. In such examples, the active alignment heads are nonetheless mounted in association with opposite sides of the vehicle such that one active alignment head can image targets located on one side of the vehicle while the other active alignment head can image targets located on the opposing side of the vehicle.

In the example of FIG. 6C, the active and passive reference pods are also mounted to a fixed or stationary reference (e.g., ground, a rack or lift, or the like), although they could alternatively be mounted to the vehicle (e.g., as shown in FIGS. 1B and 2B). Additionally, in order for the alignment system 670 to measure alignment of all four wheels of the vehicle, passive alignment heads (each including a target) are provided on all four wheels of the vehicle to be imaged by the cameras 105a and 105b of the stationary-mounted active alignment heads.

Various options exist for mounting the active or passive reference pods or other reference target(s) to the rack, vehicle lift or the like. A first option, of bolting a hanger bracket on the rack, may require drilling into the rack which may compromise the structural integrity of the rack and may in some situations not be possible. Furthermore, drilling into the rack makes for a time consuming installation process. For these reasons, this first option may not be preferred. Ideally, the active or passive reference pods or other reference targets would be removably attached to the rack or slidable so that the reference pods or targets can be moved out of the way when not in use. For this purpose, a second quick attachment method to the rack may be preferred. Further an attachment that can enable easy attachment of the reference pods or targets may be preferred, and that can allow the reference pods or target to be moved out of the way while remaining attached to the rack.

Figure 7:
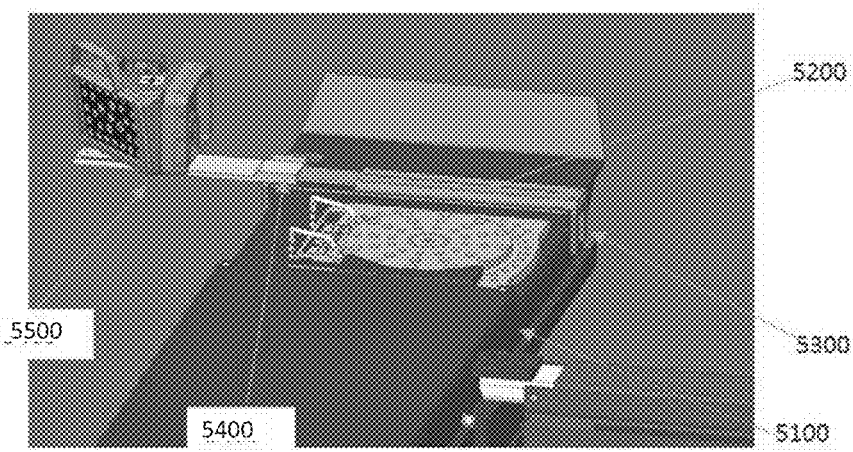
FIG. 7 shows a mount used to attach an active or passive reference pod to a rack, lift, or vehicle lift in accordance with the principles of the disclosure.

To provide the above-identified advantages, a mount is shown in FIG. 7. The mount is used to attach the reference pod or target 5500 to the rack 5100 or lift (e.g., vehicle lift). The mount includes a course width adjustment 5200 that enables a width of the mount to be adjusted so that the mount can be used on and securely mounted to racks of various sizes. Additionally, a fine adjustment 5300 latches to a side of the rack surface and is used to secure or clamp the mount to the rack. Further, a slide portion 5400 enables the reference pod or target 5500 (and/or an arm holding the reference pod or target 5500) to be slid inward and outward of the rack 5100, such that the reference pod or target 5500 can be positioned outward (into the FOV of an alignment camera or other image sensor) during an alignment process and readily slid inward afterwards in order to be out of the way and not interfere with further operations once the alignment is completed. In some situations, the reference pod or target 5500 is slid laterally outwards along the slide portion 5400 such that the reference pod or target 5500 is located laterally outwards from any wheel-mounted targets so as to ensure that the reference pod or target 5500 is not occluded by any wheel-mounted target during an alignment procedure.

Figure 8A:
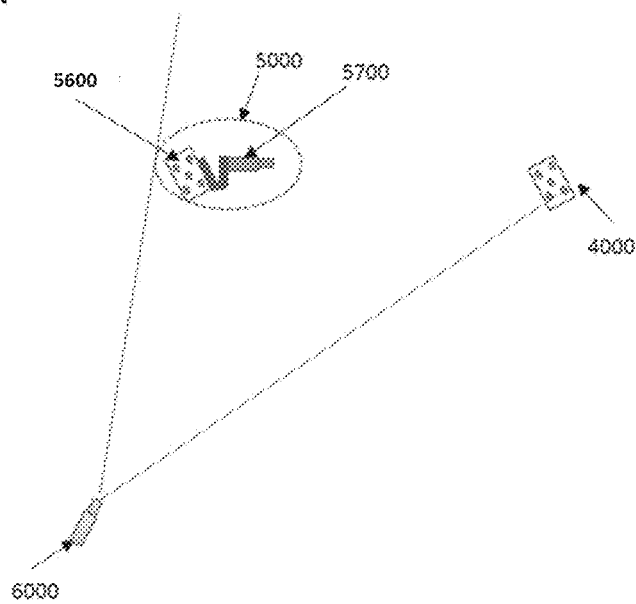
FIG. 8A shows elements involved in performing a calibration procedure for a side-to-side reference system such as those shown in FIGS. 1A and 2A.

As noted above, the use of the side-to-side reference discussed in relation to FIGS. 1A-1B, 2A-B, and 6A-6C relies on the positional relationship between the reference target 200 and calibration camera 300 of the active reference pod to be known. The positional relationship may be set during manufacture of the side-to-side reference, and may be known based on the manufacturing specifications of the apparatus. Alternatively, the positional relationship may be adjustable or variable. In both cases, a calibration process, described below in relation to FIGS. 8A and 8B, may be used in order to measure the relative position for use during alignment processes.

The calibration process may be performed following manufacturing in the factory, or can be performed in the field (for example following the replacement of a part of the side-to-side reference, following possible damage to the side-to-side reference, or simply to confirm that the factory specifications are still accurate).

Figure 8B:
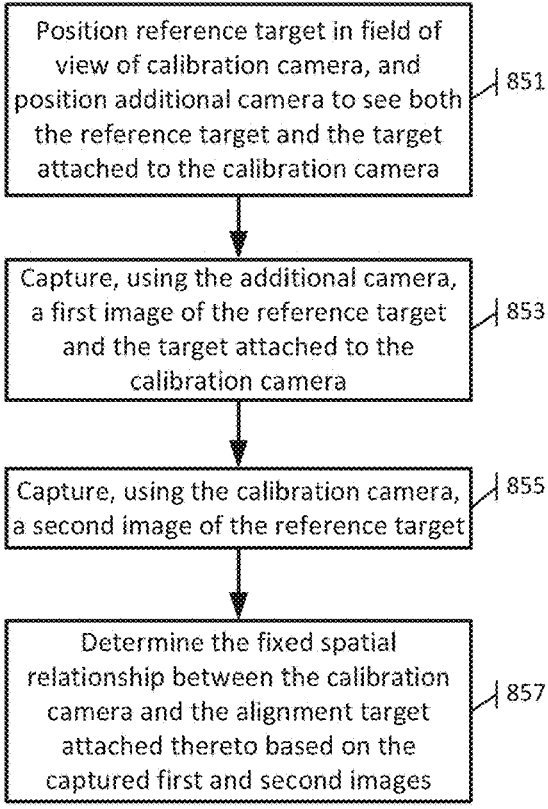
FIG. 8B is a high-level flow diagram showing steps involved in calibration of a side-to-side reference system such as those shown in FIGS. 1A, 2A, and 8A.

To perform the calibration, the procedure 850 shown in FIG. 8B can be used. In step 851, the second reference target 4000 and the active reference pod 5000 (including first reference target 5600 and the calibration camera 5700 fixedly attached thereto) are positioned relative to each other such that the calibration camera 5700 can capture an image of and measure the position of the reference target 4000 relative to the calibration camera 5700. Additionally, an additional camera 6000 is positioned such that both the first and second reference targets 5600 and 4000 are within its FOV. The additional camera 6000 can then capture an image of both reference targets 5600 and 4000, and establish the positions of the reference targets 5600 and 4000 relative to the camera 6000.

Once the cameras and targets are in position, the camera 6000 captures a first image of first reference target 5600 and second reference target 4000 so as to measure the pose of first reference target 5600 and second reference target 4000, in step 853. The measured pose is used to calculate a rotational matrix from reference target 4000 to reference target 5600. Additionally, in step 855, the calibration camera 5700 captures a second image of the reference target 4000 so as to measure the pose of reference target 4000 with respect to the calibration camera 5700. With the rotation matrix of the reference target 4000 to the reference target 5600, and with the pose of reference target 4000 with respect to the calibration camera 5700, a rotation matrix relating measurements from the reference target 5600 to the calibration camera 5700 is determined. In this way, the fixed spatial relationship between the calibration camera 5700 and the alignment target 5600 attached thereto can be determined based on the captured first and second images. The rotational matrix can then be used to update the relative positions (rotation matrix) between the two reference targets 5600 and 4000 every time the calibration camera 5700 measures the pose of the reference target 4000, as during an alignment procedure.

In order to effect the appropriate coordinate transformations, two different coordinate transformations can be used: an "RTTP" which, in combination with a transformation of target coordinates into calibration camera coordinates can provide an "RCTP" result.

The transformation from a second to a first reference target can be computed as:

$$T_{ref2\_ref1} = T_{refcam\_ref1}(T_{refcam\_ref2}^{-1})$$

Equation 13: 3D Rigid Body Transformation from Second Reference Target Coordinate System 4000 to First Reference Target Coordinate System 5600

Where:

$T^{-1}_{refcam\_ref2}$ is the inverse of the 3D rigid body transformation from the reference camera coordinate system 6000 to the second reference target coordinate system 4000; that is, it is the transformation from the second reference target coordinate system to the reference camera coordinate system, $T_{refcam\_ref1}$ is the 3D rigid body transformation from the reference camera coordinate system 6000 to the first reference target coordinate system 5600, and $T_{ref2\_ref1}$ is the 3D rigid body transformation from the second reference target coordinate system 4000 to the first reference target coordinate system 5600.

The transformation from the second to the first reference target can be used (in conjunction with additional information) to compute the transformation from the first reference target 5600 to the calibration camera 5700. This process can be computed as:

$$T_{ref1\_calcam} = T_{ref2\_ref1}(T_{calcam\_ref2})$$

Equation 14: 3D Rigid Body Transformation from First Reference Target Coordinate System 5600 to Calibration Camera Coordinate System 5700

Where:

$T_{calcam\_ref2}$ is the 3D rigid body transformation from the calibration camera coordinate system 5700 to the second reference target coordinate system 4000, $T_{ref2\_ref1}$ is the 3D rigid body transformation from the second reference target coordinate system 4000 to the first reference target coordinate system 5600 (as computed previously in Equation 13), and $T_{ref1\_calcam}$ is the 3D rigid body transformation from the first reference target coordinate system 5600 to the calibration camera coordinate system 5700.

Figure 9:
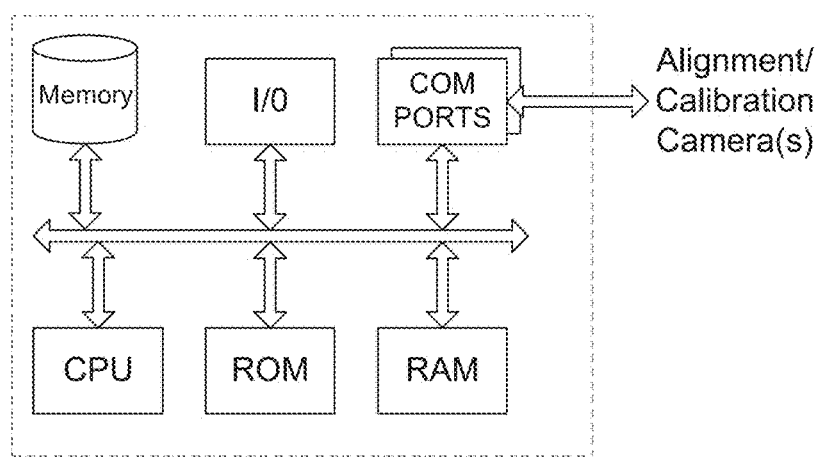
FIG. 9 is a simplified functional block diagram of a computer hardware platform that may be configured as a processing platform of a wheel alignment system such as those described throughout the disclosure.

FIG. 9 provides a functional block diagram illustration of a computer hardware platform configured for use in the vehicle alignment systems described above to provide the functionality of the systems as described. As shown in FIG. 9, a host computer platform includes a data communication interface for data communication with one or more alignment or calibration cameras such as those described above. The computer platform also includes a central processing unit (CPU), in the form of one or more processors, for executing program instructions. The computer platform typically includes an internal communication bus, program storage and data storage for various data files to be processed, and an input/output interface for communication with one or more users or other networked devices. The computer platform may additionally be configured to send and receive programming, data, and control instructions via network communications. Of course, the computer functions may be implemented in a distributed fashion on a number of similar platforms, to distribute the processing load.

The host computer platform is communicatively connected to the alignment or calibration cameras through wired or wireless communication links. For this purpose, the host computer platform and each camera has a wired or wireless communication transceiver therein. In particular, in the case of a wireless communication link, the host computer platform and the camera(s) each have a wireless transceiver through which a wireless communication link can be established. The wired or wireless communication links are used to communicate captured image data from the camera(s) to the host computer platform, and can also be used to communicate control commands or software updates from the host computer platform to the camera(s).

In operation, when a wheel alignment procedure or a calibration procedure is performed, the CPU of the host computer platform causes one or more connected alignment and/or calibration camera(s) to capture images. Typically, the images are captured so as to show therein one or more alignment or reference targets according to which positions can be determined. A single image or plural images are captured, including images captured prior to and following movement of the vehicle notably in situations in which an axis of rotation of a wheel is to be determined.

The host computer platform can store the captured images in memory. Additionally, known positional relationships (when known) are stored in memory including, for example, a known positional relationship between a calibration camera (e.g., 300) and a reference target (e.g., 200) of a side-to-side reference system 100; a known positional relationship between a calibration target (e.g., 310) and a reference target (e.g., 210); a known positional relationship between two cameras (120, 140) that are mounted together in a camera assembly; and the like.

The host computer platform is operative to process the captured images in order to identify the alignment targets or reference targets therein, and to determine the position of the alignment targets or reference targets relative to the cameras based on the locations of the targets in the captured images. For example, methods such as those described in U.S. Pat. Nos. 7,313,869 and 7,369,222, and 7,415,324, which are hereby incorporated by reference in their entireties. In turn, the host computer platform can determine the alignment of the vehicle wheels based on the determined positions of the targets relative to the cameras and the further steps detailed herein, including steps based on the stored positional relationship data described above.

As such, aspects of the alignment measurement methods detailed above may be embodied in programming stored in the memory of the computer platform and configured for execution on the CPU of the computer platform. Furthermore, data on alignment targets including known relative position data of targets and/or cameras, data on alignment and calibration cameras, and the like, may be stored in the memory of the computer platform for use in computing alignment measurements.

The drawing figures presented in this document depict one or more implementations in accord with the present teachings, by way of example only, not by way of limitation. In the figures, like reference numerals refer to the same or similar elements.

In the foregoing detailed description, numerous specific details are set forth by way of examples in order to provide a thorough understanding of the relevant teachings. However, it should be apparent to those skilled in the art that the present teachings may be practiced without such details. In other instances, methods, procedures, components, and/or circuitry have been described at a relatively high-level, without detail, in order to avoid unnecessarily obscuring aspects of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A wheel alignment system comprising:
   a pair of first and second passive heads, each comprising a target, for mounting in association with a first pair of wheels disposed on first and second sides, respectively, of a vehicle that is to be measured by operation of the wheel alignment system;
   an active reference pod comprising a reference image sensor fixedly attached to a reference target, for mounting to a stationary reference at a location on the first side of the vehicle such that the reference image sensor produces image data including a perspective representation of a passive reference pod mounted to the stationary reference and comprising at least one target disposed on the second side of the vehicle;
   a pair of first and second active heads, each comprising an image sensor, for mounting in association with the first and second sides of the vehicle, respectively, the image sensor of the first active head producing image data including a perspective representation of the targets of the first passive head mounted in association with a first wheel of the first pair of wheels and of the active reference pod mounted to the stationary reference, and the image sensor of the second active head producing image data including a perspective representation of the targets of the second passive head mounted in association with a second wheel of the first pair of wheels and of the passive reference pod mounted to the stationary reference; and
   a computer for processing image data from the image sensors relating to the observations of the targets to compute at least one alignment measurement of the vehicle based on a spatial relationship between the active reference pod, mounted to the stationary reference, and the passive reference pod, mounted to the stationary reference, determined according to the image data produced by the reference image sensor.

2. The wheel alignment system of claim 1, wherein the computer computes the spatial relationship between the active reference pod and the passive reference pod based on the image data produced by the reference image sensor and including the perspective representation of the passive reference pod, and based on a known spatial relationship between the reference image sensor and the reference target of the active reference pod.

3. The wheel alignment system of claim 1, wherein the passive reference pod comprises first and second targets, the reference image sensor produces image data including a perspective representation of the first target of the passive reference pod, and the image sensor of the second active head produces image data including a perspective representation of the second target of the passive reference pod.

4. The wheel alignment system of claim 3, wherein the first and second targets of the passive reference pod have a known spatial relationship to each other, and the computer computes the spatial relationship between the active reference pod and the passive reference pod according to the image data produced by the image sensors and the known spatial relationship between the first and second targets of the passive reference pod.

5. The wheel alignment system of claim 1, wherein the stationary reference having the active and passive reference pods mounted thereto is a ground, a rack, or a lift.

6. The wheel alignment system of claim 1, wherein the first and second active heads are for mounting to a stationary reference.

7. The wheel alignment system of claim 1, wherein the first and second active heads are for mounting to the vehicle that is to be measured by operation of the wheel alignment system.

8. The wheel alignment system of claim 7, wherein the first and second active heads are for mounting in association with a second pair of wheels disposed on the first and second sides of the vehicle.

9. A method for measuring an alignment of a vehicle comprising:
   attaching a pair of first and second passive heads, each comprising a target, in association with a first pair of wheels disposed on first and second sides, respectively, of the vehicle that is to be measured;
   providing an active reference pod, comprising a reference image sensor fixedly attached to a reference target, mounted to a stationary reference at a location on the first side of the vehicle;
   capturing, using the reference image sensor of the active reference pod provided on the first side of the vehicle, image data including a perspective representation of a passive reference pod mounted to the stationary reference and comprising at least one target disposed on the second side of the vehicle;
   capturing, using an image sensor of a first active head mounted in association with the first side of the vehicle, image data including a perspective representation of the targets of the first passive head mounted in association with a first wheel of the first pair of wheels and of the active reference pod mounted to the stationary reference;
   capturing, using an image sensor of a second active head mounted in association with the second side of the vehicle, image data including a perspective representation of the targets of the second passive head mounted in association with a second wheel of the first pair of wheels and of the passive reference pod mounted to the stationary reference; and
   processing the image data from the image sensors relating to the observations of the targets to compute at least one alignment measurement of the vehicle based on a spatial relationship between the active reference pod, mounted to the stationary reference, and the passive reference pod, mounted to the stationary reference, determined according to the image data produced by the reference image sensor.

10. The method of claim 9, wherein the processing comprises computing the spatial relationship between the active reference pod and the passive reference pod based on the image data produced by the reference image sensor and including the perspective representation of the passive reference pod, and based on a known spatial relationship between the reference image sensor and the reference target of the active reference pod.

11. The method of claim 9, wherein the passive reference pod comprises first and second targets,
   the capturing, using the reference image sensor, image data comprises capturing image data including a perspective representation of the first target of the passive reference pod, and
   the capturing, using the image sensor of the second active head, image data comprises capturing image data including a perspective representation of the second target of the passive reference pod.

12. The method of claim 11, wherein the first and second targets of the passive reference pod have a known spatial relationship to each other, and the processing the image data comprises computing the spatial relationship between the active reference pod and the passive reference pod according to the image data produced by the image sensors and the known spatial relationship between the first and second targets of the passive reference pod.

13. The method of claim 9, further comprising mounting the active and passive reference pods to the stationary reference prior to capturing image data using the reference image sensor and the image sensors of the first and second active heads, wherein the stationary reference is a ground, a rack, or a lift.

14. The method of claim 9, further comprising mounting the first and second active heads to a stationary reference prior to capturing image data using the image sensors of the first and second active heads.

15. The method of claim 9, further comprising mounting the first and second active heads in association with the vehicle that is to be measured by operation of the wheel alignment system prior to capturing image data using the images sensors of the first and second active heads.

16. The method of claim 15, wherein the mounting comprises mounting the first and second active heads in association with a second pair of wheels disposed on the first and second sides of the vehicle.

* * * * *